United States Patent
Nakamura

(10) Patent No.: US 9,875,072 B2
(45) Date of Patent: Jan. 23, 2018

(54) INFORMATION PROCESSING SYSTEM, TERMINAL DEVICE, INFORMATION PROCESSING APPARATUS AND NON-TRANSITORY COMPUTER READABLE MEDIUM

(71) Applicant: FUJI XEROX CO., LTD., Tokyo (JP)

(72) Inventor: Takashi Nakamura, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 15/250,995

(22) Filed: Aug. 30, 2016

(65) Prior Publication Data
US 2017/0277483 A1    Sep. 28, 2017

(30) Foreign Application Priority Data

Mar. 28, 2016   (JP) ................................ 2016-063303

(51) Int. Cl.
| | |
|---|---|
| *G06K 15/00* | (2006.01) |
| *G06F 3/12* | (2006.01) |
| *H04L 29/06* | (2006.01) |
| *H04L 29/08* | (2006.01) |
| *H04L 29/12* | (2006.01) |

(52) U.S. Cl.
CPC ............ *G06F 3/1222* (2013.01); *G06F 3/129* (2013.01); *G06F 3/1238* (2013.01); *H04L 63/08* (2013.01); *H04L 61/1582* (2013.01); *H04L 67/10* (2013.01); *H04L 67/42* (2013.01)

(58) Field of Classification Search
CPC ...... G06F 3/1222; G06F 3/1238; G06F 3/129; H04L 63/08; H04L 61/1582; H04L 67/10; H04L 67/42

USPC ........................................................ 358/1.14
See application file for complete search history.

(56) References Cited

U.S. PATENT DOCUMENTS

| | | | |
|---|---|---|---|
| 2006/0077119 A1* | 4/2006 | Zhang | H04N 1/00204 345/2.1 |
| 2007/0086051 A1 | 4/2007 | Kunori | |
| 2012/0147420 A1* | 6/2012 | Nishimi | G06F 3/1204 358/1.15 |

(Continued)

FOREIGN PATENT DOCUMENTS

| | | |
|---|---|---|
| JP | 2007-042098 | 2/2007 |
| JP | 2007-141215 | 6/2007 |

OTHER PUBLICATIONS

Abstract and machine translation of JP 2007-042098.

*Primary Examiner* — Neil R McLean
(74) *Attorney, Agent, or Firm* — Fildes & Outland, P.C.

(57) ABSTRACT

There is provided an information processing system. A terminal device includes a parameter transmission unit that transmits a parameter being used for designating processing which is performed by using a first file; an instruction data transmission unit that transmits instruction data for storing a second file which is a duplicate of the first file; a control data memory that store control data which includes the parameter and storing location information of the second file. A control data transmission unit transmits the stored control data, acquires the second file by requiring transmission of the second file based on the storing location information, and transmits the acquired second file to the information processing apparatus which performs processing designated by the parameter included in the control data.

8 Claims, 11 Drawing Sheets

(56) References Cited

U.S. PATENT DOCUMENTS

2014/0118777 A1* 5/2014 Yamamoto ............. G06F 3/121
  358/1.15
2016/0212207 A1* 7/2016 Guo ....................... H04L 29/08

* cited by examiner

INFORMATION PROCESSING SYSTEM, TERMINAL DEVICE, INFORMATION PROCESSING APPARATUS AND NON-TRANSITORY COMPUTER READABLE MEDIUM

CROSS-REFERENCE TO RELATED APPLICATION

This application is based on and claims priority under 35 USC 119 from Japanese Patent Application No. 2016-063303 filed Mar. 28, 2016.

TECHNICAL FIELD

The present invention relates to an information processing system, a terminal device, an information processing apparatus and a non-transitory computer readable medium.

SUMMARY

According to an aspect of the invention, there is provided an information processing system comprising: a terminal device; and an information processing apparatus that performs processing which is designated by the terminal device, by using a file stored in an external server device, wherein the terminal device includes: a parameter transmission unit that transmits a parameter to the server device, the parameter being used for designating processing which is performed by using a first file stored in the server device; an instruction data transmission unit that transmits instruction data for performing an instruction a storing a second file which is a duplicate of the first file, to the server device; a control data memory that stores the control data which includes the parameter and storing location information indicating a storing location of the second file; and a control data transmission unit that transmits the stored control data to the information processing apparatus, and wherein the information processing apparatus includes: a control data reception unit that receives the control data from the terminal device; a file acquisition unit that requires transmission of the second file to the server device based on the storing location information which is included in the received control data, and acquires the second file; and a performing unit that performs processing which is designated by the parameter included in the received control data, by using the acquired second file.

BRIEF DESCRIPTION OF THE DRAWINGS

Exemplary embodiments of the present invention will be described in detailed based on the following figures, wherein.

DETAILED DESCRIPTION

First Exemplary Embodiment

A first exemplary embodiment of the present invention will be described with reference to the accompanying drawings.

Figure 1:
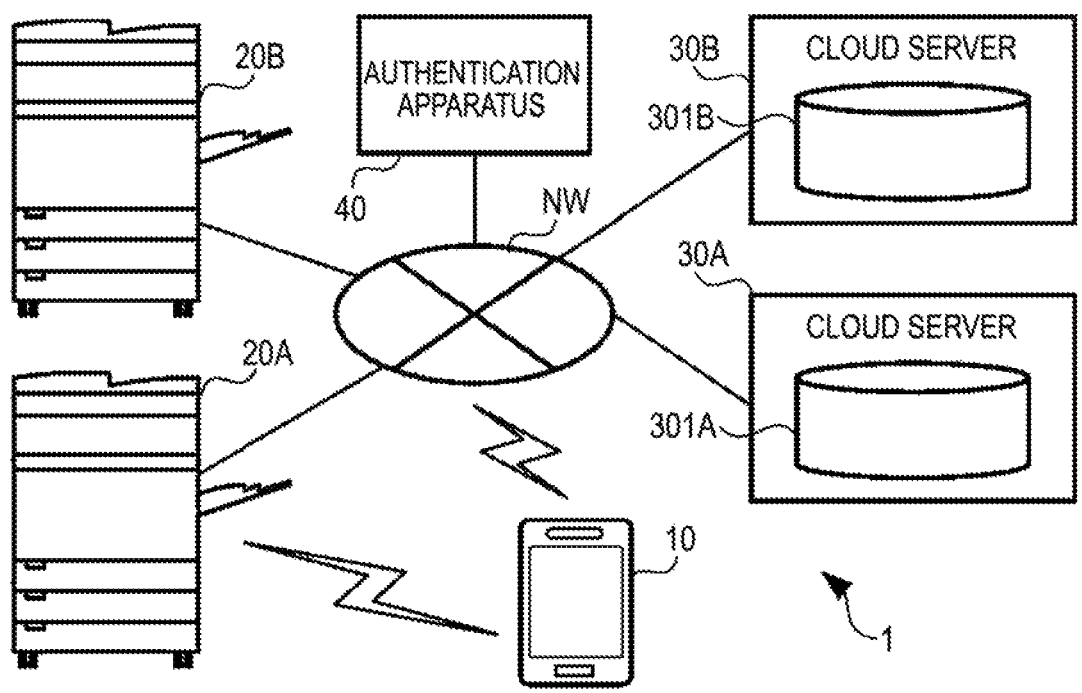
FIG. 1 is a diagram illustrating the entirety of a configuration of an information processing system according to a first exemplary embodiment of the present invention.

FIG. 1 is a diagram illustrating the entirety of a configuration of an information processing system 1 according to the first exemplary embodiment of the present invention. The information processing system 1 includes a terminal device 10, image forming apparatuses 20 (20A and 20B), cloud servers 30 (30A and 30B), and an authentication apparatus 40. Each of the terminal device 10, the image forming apparatuses 20, the cloud servers 30, and the authentication apparatus 40 is connected to a communication line NW. For example, the terminal device 10 is wirelessly connected to the communication line NW. The image forming apparatuses 20, the cloud servers 30, and the authentication apparatus 40 are wired-connected to the communication line NW. The communication line NW includes, for example, a mobile communication network and a public communication line which includes a gateway device and the Internet. However, another communication line (communication network) such as a local area network (LAN) may be included.

The terminal device 10 and each of the image forming apparatuses 20 perform near field communication with each other. The near field communication is an example of wireless communication which is performed without passing through the communication line NW. An example of the near field communication includes Bluetooth® 4.0 (so-called Bluetooth Low Energy). As the near field communication, another type of wireless communication such as ANT may be used.

FIG. 1 illustrates that two of the image forming apparatuses 20A and 20B are provided as the image forming apparatus 20, and two of the cloud servers 30A and 30B are provided as the cloud server 30. However, the number of provided image forming apparatuses may be 1 or 3 or more, and the number of provided cloud servers may be also be 1 or 3 or more. In practice, multiple terminal devices which have a function equivalent to that of the terminal device 10 are provided.

The terminal device 10 is, for example, a tablet terminal.

The terminal device 10 is used (held) by a user who uses the image forming apparatus 20 and the cloud server 30. The terminal device 10 controls the image forming apparatus 20 through the near field communication, and causes the image thrilling apparatus 20 to perform image forming processing which is processing in which an image is formed on a medium. The terminal device 10 transmits a parameter (below, referred to as "a processing parameter") for designating processing which is performed by using a file, through the communication line NW.

The transmission is performed in order to operate the file stored in the cloud server 30.

The file is a file presenting a document which includes characters or figures, for example.

However, as the file, a file presenting an image (still image or moving image), sound, or the like may be provided. An example of an operation for a file includes, an operation for creating or updating (editing) a file, and an operation for performing output processing based on the file. As the output processing, for example, processing for performing an output by display, an output by facsimile transmission or image forming processing, and an output by transmission in accordance with a communication protocol such as a file transfer protocol (FTP) is provided.

The terminal device 10 may be a terminal device such as a smart phone, a mobile phone terminal, a notebook computer, a personal digital assistant (PDA), and a portable game machine, in addition to the tablet terminal.

The image forming apparatus 20 is an example of an information processing apparatus in the exemplary embodiments of the present invention. The image forming apparatus 20 performs processing in accordance with a control of the terminal device 10. The image forming apparatus 20 has plural functions such as a primer function, a copying function, a scanning function, and a facsimile transmission function. Regarding the printer function, the image forming apparatus 20 has a function of performing full-printing by using a file which is stored in the cloud server 30. That is, the image forming apparatus 20 requires transmission of a file to the cloud server 30 through the communication line NW, and acquires the file.

The image forming apparatus 20 performs image forming processing based on the acquired file.

The cloud server 30 is an example of a server device in the exemplary embodiments of the present invention.

The cloud server 30 provides cloud storage (also referred to as an online storage) through the communication line NW. The cloud server 30 includes a storage device 301 which is exemplified as a hard disk device. In FIG. 1, the cloud server 30A includes a storage device 301A, and the cloud server 30B includes a storage device 301B. The cloud server 30 allocates a storage area of the storage device 301 to the terminal device 10, and stores a file. The storage device 301 may store a file operated by a user, and a file obtained by duplicating the file operated by a user. In the following descriptions, the former is referred to as "an original file", and the latter is referred to as "a duplicate file". The original file is an example of a first file in the exemplary embodiments of the present invention.

The duplicate file is an example of a second file in the exemplary embodiments of the present invention. The original file is operated by the terminal device 10 which is a creation source.

However, the original file may be opened to the public, and thus be operated by another terminal device.

In the cloud server 30A and the cloud server 30B, the specifications of an interface (API; application programming interface) for operating a file are different from each other. Thus, even in a case where the same operation is performed for a certain file, a format of data for performing the operation may be different between the cloud server 30A and the cloud server 30B.

The authentication apparatus 40 is a device which issues a token (digital token) for a user of the terminal device 10. The token is, an example of authentication information in the exemplary embodiments of the present invention. The token is used for authenticating a user of the terminal device 10. For example, the token is the OAuth token, but may be a random character string, and the like. The token is used for an access to the interface of the cloud server 30. The token is assumed to be commonly used between plural cloud servers 30.

Figure 2:
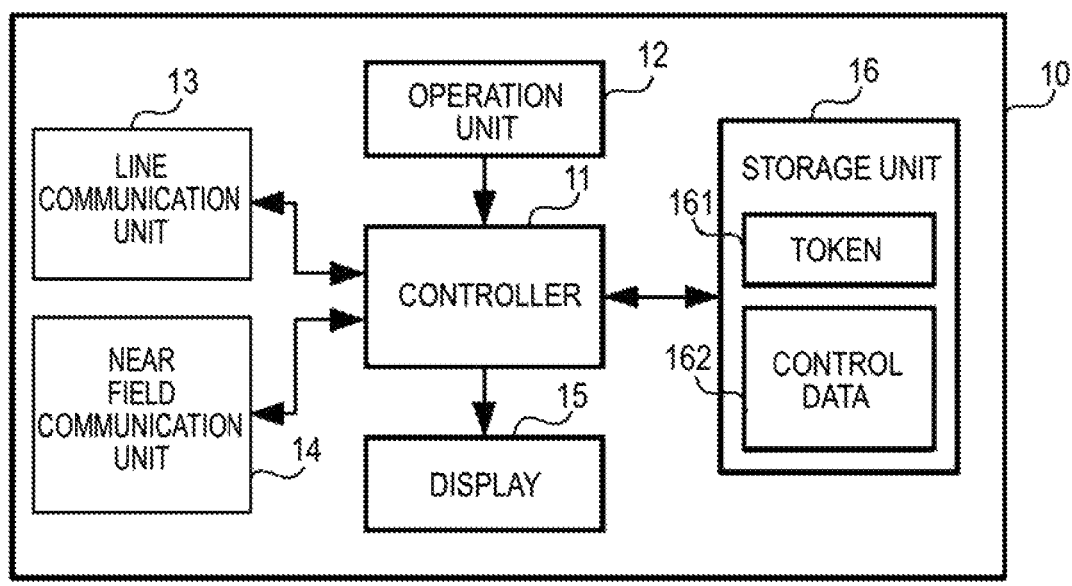
FIG. 2 is a block diagram illustrating a hardware configuration of a terminal device according to the first exemplary embodiment.

FIG. 2 is a block diagram illustrating a hardware configuration of the terminal device 10. As illustrated in FIG. 2, the terminal device 10 includes a controller 11, an operation unit 12, a line communication unit 13, a near field communication unit 14, a display 15, and a memory 16.

The controller 11 includes a microcomputer which has a CPU, a read only memory (ROM), and a random access memory (RAM). The CPU reads a program stored in the ROM or the memory 16 into the RAM, and executes the read program, so as to control the units of the terminal device 10. The operation unit 12 is an operation device which receives an operation which has been performed by a user. For example, the operation unit 12 has a touch panel which is provided on a display surface of the display 15 so as to overlap the display surface, or has physical keys. The line communication unit 13 has an interface which is wirelessly connected to the communication line NW so as to perform communication. The near field communication unit 14 has an interface for performing near field communication. For example, the display 15 is a liquid crystal display. The display 15 displays various images (screens) on a display surface for displaying an image, and thus reports information to a user.

The memory 16 includes, for example, an EEPROM (Electronically Erasable and Programmable ROM), a flash memory, or the like. The memory 16 stores a program executed by the controller 11, a token 161, and control data 162. The token 161 is a token issued by the authentication apparatus 40. That is, the memory 16 is an example of an authentication information memory in the exemplary embodiments of the present invention. The control data 162 is data used in a control for causing the image forming apparatus 20 to perform processing such as full-printing. That is, the memory 16 is an example of a control data memory in the exemplary embodiments of the present invention. The control data 162 will be described later in detail.

Figure 3:
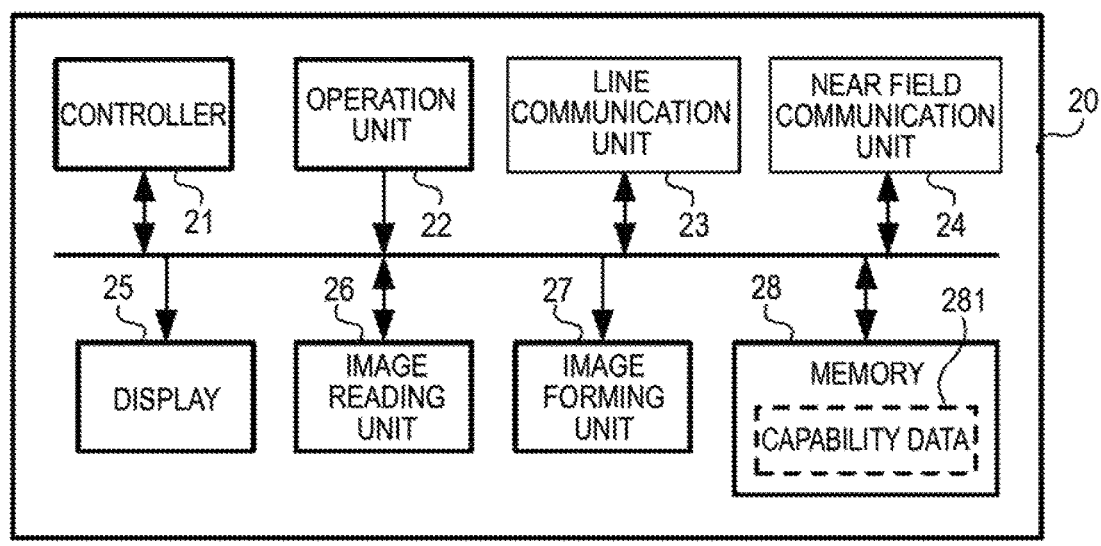
FIG. 3 is a block diagram illustrating a hardware configuration of an image forming apparatus according to the first exemplary embodiment.

FIG. 3 is a block diagram illustrating a hardware configuration of the image forming apparatus 20. As illustrated in FIG. 3, the image forming apparatus 20 includes a controller 21, an operation unit 22, a line communication unit 23, a near field communication unit 24, a display 25, an image reading unit 26, an image forming unit 27, and a memory 28. "Capability data 281" illustrated in FIG. 3 is a data relating to a second exemplary embodiment which will lye described later.

The controller 21 includes a microcomputer which has a CPU, a ROM, and a RAM. The CPU reads a program stored in the ROM or the memory 28 into the RAM, and executes the read program, so as to control the units of the image forming apparatus 20. The operation unit 22 is an operation device which receives an operation which has been performed by a user. For example, the operation unit 22 has a touch panel which is provided on a display surface of the display 25 so as to overlap the display surface, or has physical keys. The line communication unit 23 has an interface which is wired or wirelessly connected to the communication line NW so as to perform communication. The near field communication unit 24 has an interface for performing near field communication. For example, the display 25 is a liquid crystal display. The display 15 displays various images (screens) on a display surface for displaying an image, and thus notifies a user of information. The image reading unit 26 is, for example, a scanner. The image reading unit 26 reads an image of an original document, and supplies image data indicating the image which has been read, to the controller 21. The image forming unit 27 forms an image on a sheet, such as paper, by an electrophotographic process, for example. The memory 28 has a hard disk device, for example. The memory 28 stores a program executed by the controller 21.

Figure 4:
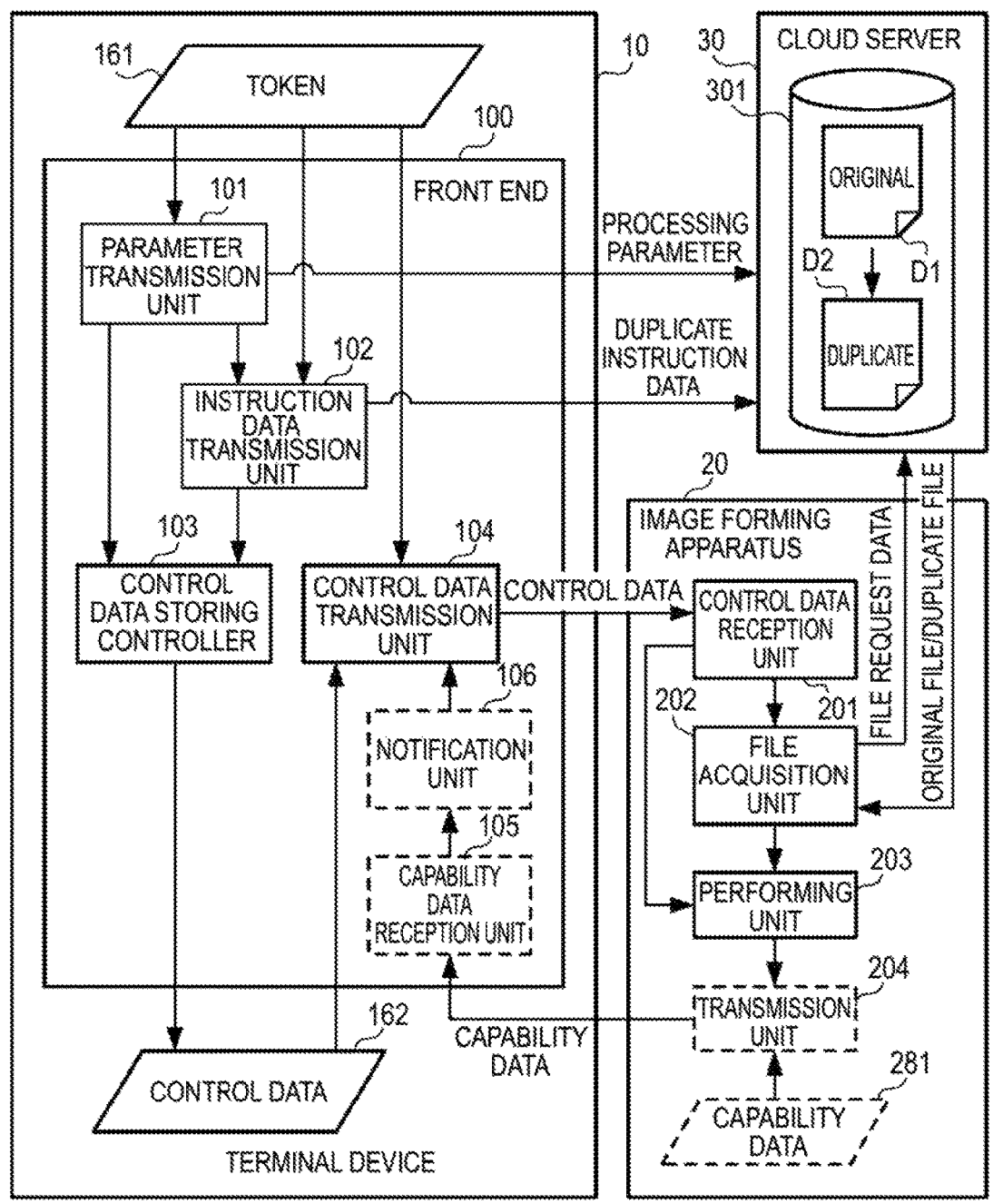
FIG. 4 is a block diagram illustrating a functional configuration of the information processing system according to the first exemplary embodiment.

FIG. 4 is a block diagram illustrating a functional configuration of the information processing system 1. Functions of "a capability data reception unit 105", "a notification unit 106", and "a transmission unit 204" illustrated in FIG. 4 are functions relating to the second exemplary embodiment which will be described later.

The terminal device 10 causes a front end 100 to realize a function for using a cloud storage. The front end 100 realizes functions which respectively correspond to a parameter transmission unit 101, an instruction data transmission unit 102, a control data storing controller 103, and a control data transmission unit 104.

The parameter transmission unit 101 transmits a processing parameter to the cloud server 30. The cloud server 30 performs processing in accordance with the processing parameter. The parameter transmission unit 101 transmits a processing parameter for operating an original file. FIG. 4 illustrates "an original file D1" as an original file which functions as a target of an operation. The parameter transmission unit 101 transmits a processing parameter which is associated with the token 161, and has a format corresponding to the cloud server 30 as a transmission destination. The parameter transmission unit 101 is realized by the controller 11 and the line communication unit 13.

The instruction data transmission unit 102 transmits instruction data (below referred to as "duplicate instruction data") for performing an instruction of storing a duplicate file which is a duplicate of the original file, to the cloud server 30. The cloud server 30 stores the duplicate file in the storage device 301, in accordance with the duplicate instruction data. It is assumed that, if an instruction of the duplicate of the original file D1 is performed, the duplicate file D2 is stored in the storage device 301. The instruction data transmission unit 102 transmits duplicate instruction data which is associated with the token 161, and has a format corresponding to the cloud server 30 as the transmission destination. The instruction data transmission unit 102 is realized by the controller 11 and the line communication unit 13.

The control data storing controller 103 controls storing of control data 162.

The control data 162 includes the processing parameter and a file path (below referred to as "a duplicate file path"). The file path indicates a storing location of the duplicate file. The duplicate file path is an example of storing location information in the exemplary embodiments of the present invention. The control data storing controller 103 is realized by the controller 11.

The control data transmission unit 104 transmits the stored control data 162 to the image forming apparatus 20. In a case where a the terminal device 10 and the image forming apparatus 20 are near to each other so as to have a distance therebetween, which allows the near field communication, the control data transmission unit 104 transmits the control data 162 by the near field communication. The control data transmission unit 104 transmits the control data 162 in association with the token 161. The control data transmission unit 104 is realized by the controller 11 and the near field communication unit 14.

The image forming apparatus 20 realizes functions which respectively correspond to a control data reception unit 201, a file acquisition unit 202, and a performing unit 203.

The control data reception unit 201 receives the control data 162 from the terminal device 10 (control data transmission unit 104). The control data reception unit 201 is realized by the controller 21 and the near field communication unit 24.

The file acquisition unit 202 transmits file request data for requiring transmission of a file, to the cloud server 30, based on the received control data 162. The file acquisition unit 202 acquires (receives) a file transmitted from the cloud server 30 in accordance with the request. Here, the file acquisition unit 202 acquires one of the original file D1 and the duplicate file D2. The control data transmission unit 104 transmits the file request data in association with the token 161. The file acquisition unit 202 is realized by the controller 21 and the line communication unit 23.

The performing unit 203 performs processing designated by a processing parameter which is included in the received control data 162. The processing is performed by using the file which has been acquired by the file acquisition unit 202. The performing unit 203 sets one of the original file and the duplicate file, as a target of the processing. The processing performed by the performing unit 203 is, for example, image forming processing. In this case, the performing unit 203 is realized by the controller 21 and the image forming unit 27.

Figure 5:
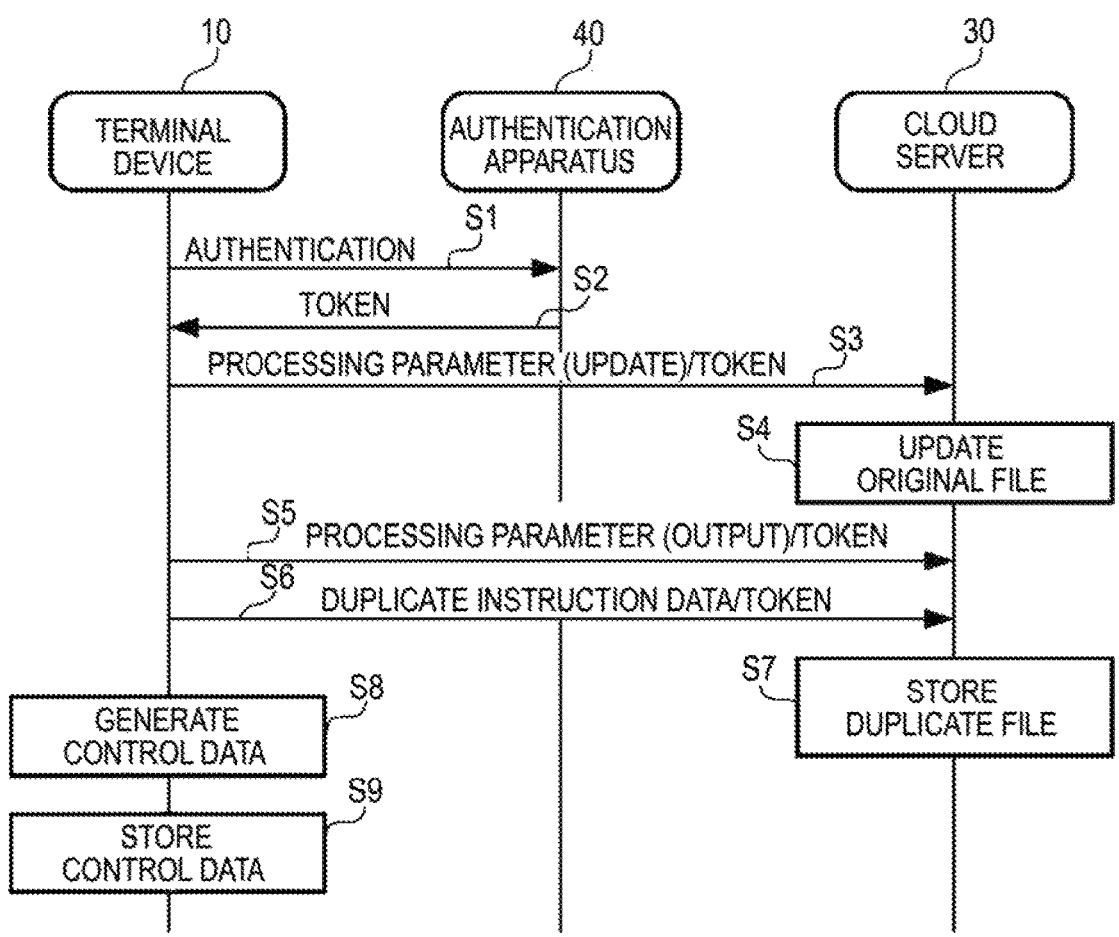
FIG. 5 is a sequence diagram illustrating a flow of processes performed when a file is operated, in the information processing system according to the first exemplary embodiment.

FIG. 5 is a sequence diagram illustrating a flow of processing performed when, a file is operated, in the information processing system 1. The terminal device 10 can operate a file as long as the terminal device 10 is at a location which allows wireless connection to the communication line NW.

As preliminary processing, the terminal device 10 requires authentication of the own device or a user thereof to the authentication apparatus 40 (Step S1). If the authentication apparatus 40 authenticates the terminal device 10 or the user thereof, the authentication apparatus 40 issues a token for using plural cloud storages of the cloud server 30, and transmits the issued token to the terminal device 10 (Step S2). The terminal device 10 receives the token from the authentication apparatus 40, and stores the received token as the token 161 in the memory 16.

The terminal device 10 accesses the cloud server 30 by using the stored token 161, and operates a file which has been stored in the cloud server 30. For example, in a case where the terminal device 10 attempts to update the original file D1 stored in the cloud server 30, the terminal device 10 transmits a processing parameter for performing an operation of the update, to the cloud server 30 in association with the token 161 (Step S3). The processing parameter is a parameter having a format which can be recognized by the cloud server 30. If it is authenticated that the terminal device 10 is valid, based on the received token 161, the cloud server 30 updates the original file D1 in accordance with the processing parameter (Step S4).

Then, it is assumed that the terminal device 10 performs an operation for performing output processing based on the original file D1. In this case, the terminal device 10 transmits a processing parameter for performing the operation, to the cloud server 30 in association with the token 161 (Step S5). If an operation for performing the output processing is performed, the terminal device 10 transmits duplicate instruction data to the cloud server 30 in association with the token 161 (Step S6). The duplicate instruction data is used for performing an instruction of duplicating the original file D1 which is, set as a target of the output processing. If it is authenticated that the terminal device 10 is valid, based on the received token 161, the cloud server 30 stores the duplicate file D2 which is a duplicate of the original file D1, in the storage device 301 in accordance with the duplicate instruction data (Step S7).

The duplicate instruction data transmitted in Step S6 is also set as a data having a format which can be recognized by the cloud server 30. For example, the format of the duplicate instruction data varies depending on whether or not the cloud server 30 supports a function which may be referred to as "snapshot" in which a file at a certain time point is, extracted and stored.

For example, in a case where the cloud server 30A supports the snapshot function, the terminal device 10 may perform an instruction of generating and storing a duplicate file, by using the snapshot function. In this case, in the cloud server 30A, for example, the duplicate file D2 is stored in a storage area which is allocated so as to correspond to the snapshot function, in the storage device 301A. The terminal device 10 acquires a file path indicating a storing location of the duplicate file D2, from the cloud server 30A. The file path indicating a storing location of the duplicate file is referred to as "a duplicate file path" below.

For example, in a case where the cloud server 30B does not support the snapshot function, for example, the terminal device 10 generates a duplicate file D2 obtained by duplicating the original file D1, and transmits the generated duplicate file D2 and the duplicate file path for designating the storing location, to the cloud server 30B. The cloud server 30B stores the duplicate file D2 which has been received from the terminal device 10, in the storage device 301B in accordance with the designated duplicate file path.

With the process of Step S6, the duplicate file D2 is stored in the cloud server 30 regardless of whether or not the cloud server 30 supports the snapshot function.

Then, the terminal device 10 generates control data, and stores the generated control data as the control data 162, in the memory 16 (Steps S8 and S9).

Figure 6:
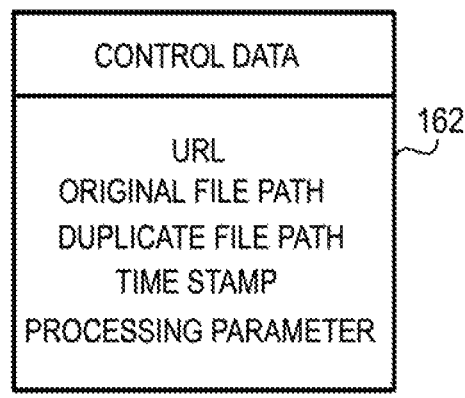
FIG. 6 is a diagram illustrating a configuration of control data according to the first exemplary embodiment.

FIG. 6 is a diagram illustrating a configuration of the control data 162. As illustrated in FIG. 6, the control data 162 includes a uniform resource locator (URL), an original file path, a duplicate file path, a time stamp, and a processing parameter.

The URL is access destination information indicating a location of the cloud server 30 on the communication line NW. The original file path is a file path indicating a storing location of the original file. As described above, the duplicate file path is a file path indicating a storing location of the duplicate file. The time stamp is an example of a first time stamp in the exemplary embodiments of the present invention. The time stamp indicates a time point (for example, date and time when the duplicate file is generated) when the processing parameter in Step S5 has been transmitted. The time stamp indicates a time point of an original file used for generating a duplicate file. The processing parameter is the same as the processing parameter which has been transmitted in Step S5. However, the processing parameter includes a parameter for designating the type of output processing, and various parameters for designating the output processing. In a case of the image forming processing, a parameter relating to various settings for a color mode, N up (that is, images of N pages are collectively printed on one side of one sheet), simplex/duplex printing, post-processing, and the like is provided as the latter parameter.

The above descriptions are for processing performed in a case where the terminal device 10 operates a file.

Figure 7:
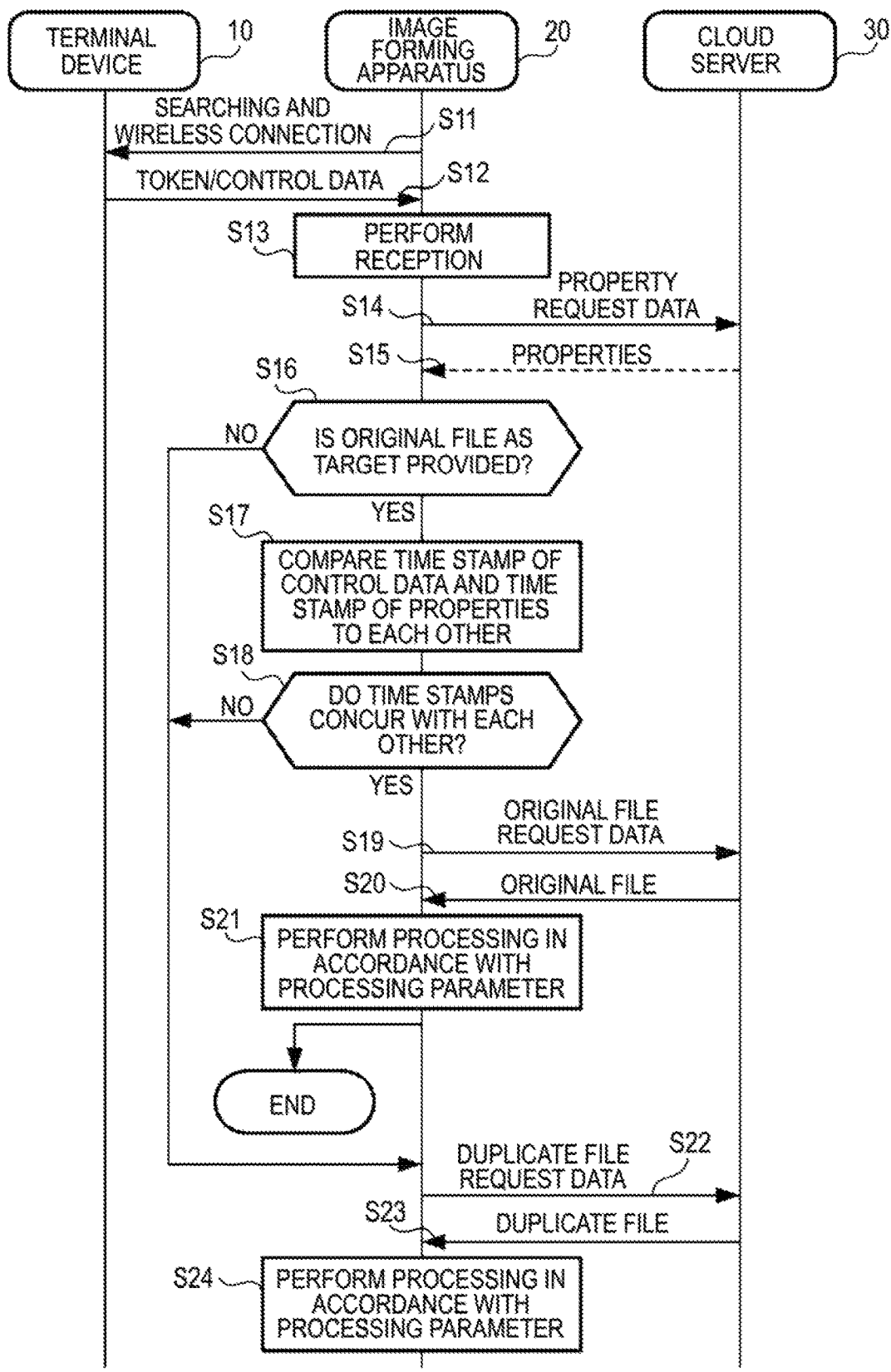
FIG. 7 is a sequence diagram illustrating a flow of processes performed in image forming processing, in the information processing system according to the first exemplary embodiment.

FIG. 7 is a sequence diagram illustrating a flow of processing performed based on control data in the information processing system 1. A case where the image forming processing is performed will be described below.

After the processing described with FIG. 5, the user of the terminal device 10 comes to a location at which the image forming apparatus 20 is installed. The terminal device 10 searches for an external device which can be wirelessly connected with the terminal device 10 by the near field communication. The searching is performed sequentially or in accordance with an instruction of the user. If the terminal device 10 approaches any image forming apparatus 20, the terminal device 10 performs wireless connection with the image forming apparatus 20 by the near field communication (Step S11). Then, the terminal device 10 transmits the token 161 and the control data 162 which have been stored in the memory 16, to the image forming apparatus 20 by the near field communication (Step S12).

The image forming apparatus 20 receives the token 161 and the control data 162 (Step S13). Then, the image forming apparatus 20 transmits property request data to the cloud server 30 based on the token 161 and the control data 162 which have been received (Step S14). The image forming apparatus 20 accesses a cloud server 30 designated by the of the control data 162. The property request data is data for requiring transmission of properties of the original file, based on the original file path which is included in the control data 162. The properties of the original file include the last update date and time of the original file. If it is authenticated that the image forming apparatus 20 is valid, based on the token 161, the cloud server 30 transmits the properties.

In a case where the image firming apparatus 20 acquires (receives) the properties which have been transmitted from the cloud server 30 (Step S15), the image forming apparatus 20 determines whether or not the original file is provided (Step S16). In a case where the image forming apparatus 20 acquires the properties, the image forming apparatus 20 determines that the original file is present at the storing location designated by the original file path of the control data 162 (YES in Step S16).

Then, the image forming apparatus 20 compares a time stamp of the control data 162 and a time stamp of the properties to each other (Step S17). The time stamp of the properties is an example of a second time stamp in the exemplary embodiments of the present invention. The time stamp of the properties indicates a time point (that is, the last update date and time) when the original file D1 is update last.

Then, the image forming apparatus 20 determines whether or not the time stamps which have been compared to each other concur with each other (Step S18). In a case where it is determined to be "YES" in Step S18, this determination means that the original file D1 is stored in the cloud server 30 without a change from the time point when the processing parameter has been transmitted in Step S5. In this case, the image firming apparatus 20 transmits original file request data for requiring transmission of the original file D1, to the cloud server 30 (Step S19). This file request data includes, for example, the token 161 or the original file path the control data 162. If it is authenticated that the image forming apparatus 20 is valid, based on the token 161, the cloud server 30 transmits the original file D1.

Figure 8:
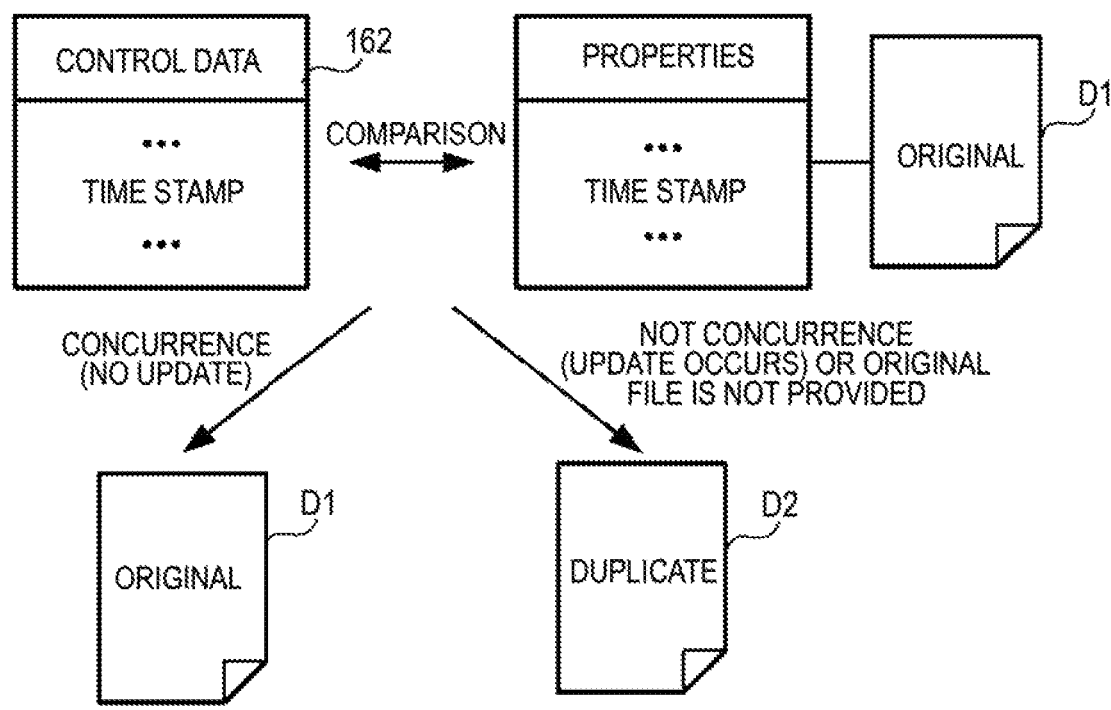
FIG. 8 is a diagram illustrating a file transmission request according to the first exemplary embodiment.

If the image forming apparatus 20 acquires (receives) the original file D1 which has been transmitted from the cloud server 30 (Step S20), the image forming apparatus 20 performs processing in accordance with the processing parameter included in the control data 162 (Step S21). Here, as illustrated in FIG. 8, the image forming apparatus 20 performs the image forming processing designated by the processing parameter, based on the original file D1.

For example, in a case where the original file D1 is deleted by another terminal device, the original file to be set as a target of the processing is not provided in the cloud server 30. In this case, the image forming apparatus 20 does not acquire the properties of the original file D1 in Step S15, and thus the image forming apparatus 20 determines "NO" in Step S16. In a case where the original file D1 is provided, but when the original file D1 is revised by another terminal device, the original file D1 becomes different from a file having the time point when the processing parameter is transmitted in Step S5. In this case, the image forming apparatus 20 determines "NO" in Step S18.

In a case where the image forming apparatus 20 determines "N" in Step S16 or S18, the image forming apparatus 20 transmits duplicate file request data for requiring transmission of the duplicate file D2, to the cloud server 30 (Step S22). The duplicate the request data includes the token 161 or the duplicate file path of the control data 162, if it is authenticated that the image forming apparatus 20 is valid, based on the received token 161, the cloud server 30 transmits the duplicate file D2.

If the image forming apparatus 20 acquires (receives) the duplicate file D2 which has been transmitted from the cloud server 30 (Step S23), the image forming apparatus 20 performs processing in accordance with the processing, parameter included in the control data 162 (Step S24). Here, as illustrated in FIG. 8, the image forming apparatus 20 performs the image forming processing designated by the processing parameter, based on the duplicate file D2. The duplicate file is substantially the same as the original file having a time point when an operation for the output processing is performed. Thus, a result of performing the process in Step S24 is the same as the result of performing the processing performed based on the original file D1 which has the time point when this operation is performed.

According to the first exemplary embodiment, even in a case where contents stored in the external cloud server 30 are deleted or updated by the third parties, the image forming apparatus 20 can acquire the file designated by a user, and perform processing such as the image forming processing. Thus, performing of the processing in the image forming apparatus 20 at a time point after this designation is assured.

The terminal device 10 transmits data of a format depending on the interface of the cloud server 30, to the cloud server 30. Thus, even in a case where plural cloud server 30 have different interfaces, the terminal device 10 can cause the image forming apparatus 20 to perform processing.

Even in a case where a user does not operate the image forming apparatus 20, the user holds the terminal device 10 and approaches the image forming apparatus 20, and thus the image forming apparatus 20 can be caused to perform processing which has been previously designated. In a case where plural pieces of designated processing, are provided, for example, in a case where plural pieces of control data 162 are provided, a user may designate processing to be performed, by an operation of the terminal device 10 or the image forming apparatus 20.

Since the token 161 is commonly used between plural cloud servers 30, a load on an operation of a user, which relates to authentication, is reduced in comparison to a case where different authentication information is provided for each cloud server 30.

Second Exemplary Embodiment

Next, the second exemplary embodiment according to the present invention will be described.

In the information processing system 1 according to the second exemplary embodiment, the image forming apparatus 20 transmits information regarding capability for performing processing in the own apparatus, by the near field communication. The terminal device 10 notifies a user of information regarding the image forming apparatus 20, based on the transmitted information.

The memory 28 of the image forming apparatus 20 according to the second exemplary embodiment includes capability data 281 illustrated in FIG. 3. The capability data 281 is data indicating capability for performing processing of the image forming apparatus 20 (more specifically, performing unit 203). The capability data 281 includes, for example, information for specifying performable processing or for specifying a function mounted therein.

In the information processing system 1 according to the second exemplary embodiment, as illustrated in FIG. 4, the image forming apparatus 20 realizes a function corresponding to the transmission unit 204, and the terminal device 10 realizes functions corresponding to the capability data reception unit 105 and the notification unit 106.

The transmission unit 204 transmits the capability data 281 indicating capability for performing processing of the performing unit 203, by using the near field communication. The transmission unit 204 is realized by the controller 21 and the near field communication unit 24.

The capability data reception unit 105 receives the capability data 281 from the image forming apparatus 20. The capability data reception unit 105 is realized by the controller 11 and the near field communication unit 14.

The notification unit 106 performs a notification of information regarding a result of performing processing performed by the performing unit 203, based on the received capability data 281, and the processing parameter included in the control data 162. As the information regarding the performing result, an image (below referred to as "print image") formed on a medium by the image forming processing is provided. The print image may be an image for so-called a preview display, or for thumbnail display.

Figure 9:
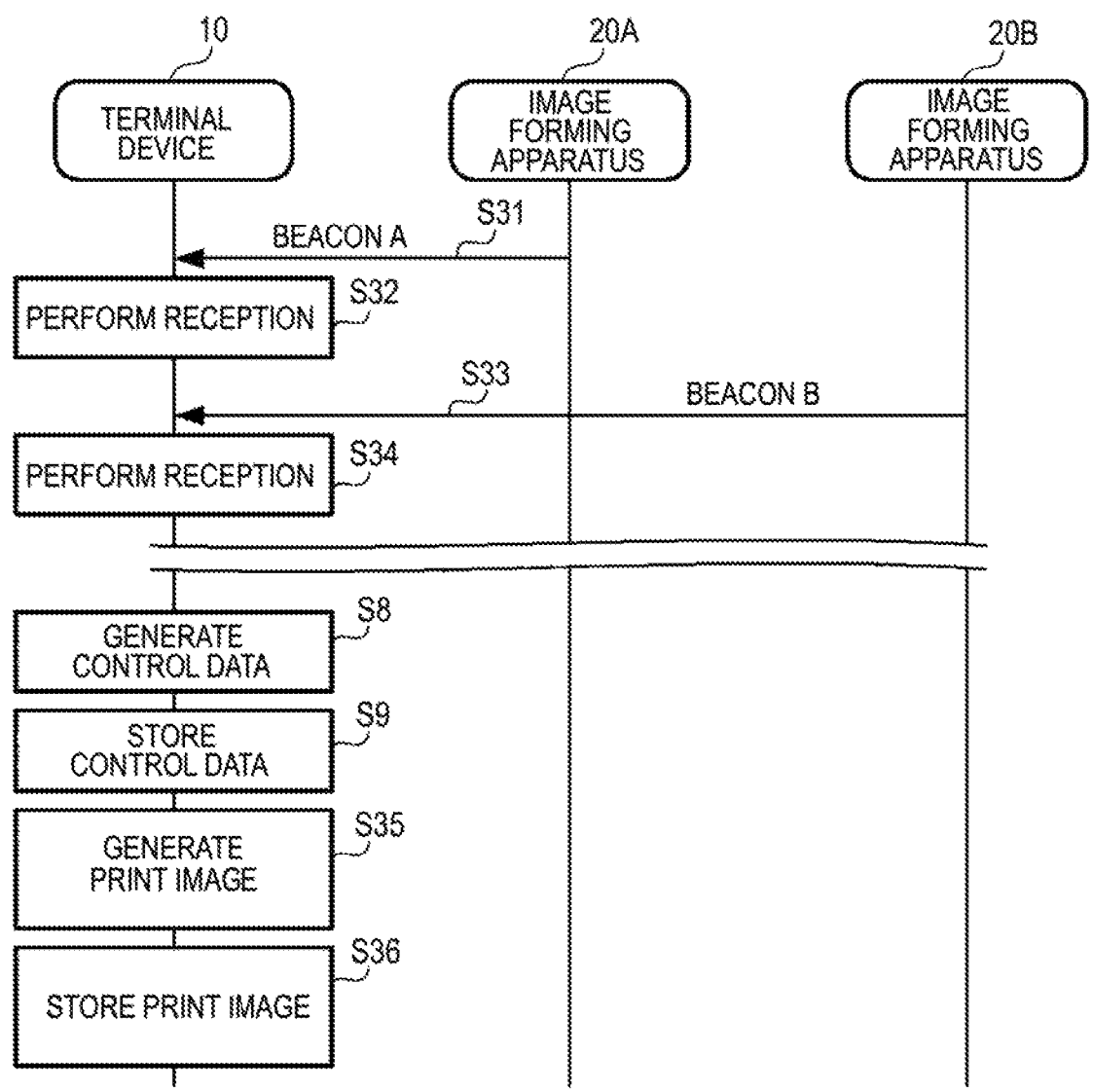
FIG. 9 is a sequence diagram illustrating, a flow of processes performed when a file is operated, in an information processing system according to a second exemplary embodiment of the present invention.

FIG. 9 is a sequence diagram illustrating a flow of processing performed when a file is operated, in the information processing system 1. FIG. 9 illustrates processing in a case where the terminal device 10 is at a position which allows near field communication with the image forming apparatuses 20A and 20B.

The image forming apparatuses 20A and 20B transmit a beacon, for example, at a predetermined interval by broadcasting. The beacon includes so-called an advertisement packet. The beacon causes a usable service by using the capability data 281, further, by using the image forming apparatus 20, or information such as identification information (for example, type number) of the image forming apparatus 20 to be transmitted.

A beacon transmitted by the image forming apparatus 20A is referred to as "a beacon A", and a beacon transmitted by the image forming apparatus 20B is referred to as "a beacon B".

The terminal device 10 receives the beacon A transmitted by the image forming apparatus 20A (Steps S31 and S32), and receives the beacon B transmitted by the image forming apparatus 20B (Steps S33 and S34). The terminal device 10 stores the capability data 281 in the memory 16, based on the beacon A and the beacon B which have been received.

Then, in the information processing system 1, as in the above-described first exemplary embodiment, the processes of Steps S1 to S7 are performed. The terminal device 10 generates the control data 162, and stores the generated control data 162 in the memory 16 (Steps S8 and S9).

The terminal device 10 generates a print image for each image forming apparatus 20, based on the capability data 281 which has been stored in the memory 16, and the processing parameter included in the control data 162. The terminal device 10 stores the generated print image in the memory 16 (Steps S35 and S36). The print image is obtained, for example, in such a manner that an image formed by the image forming processing is indicated with low resolution.

Figure 10:
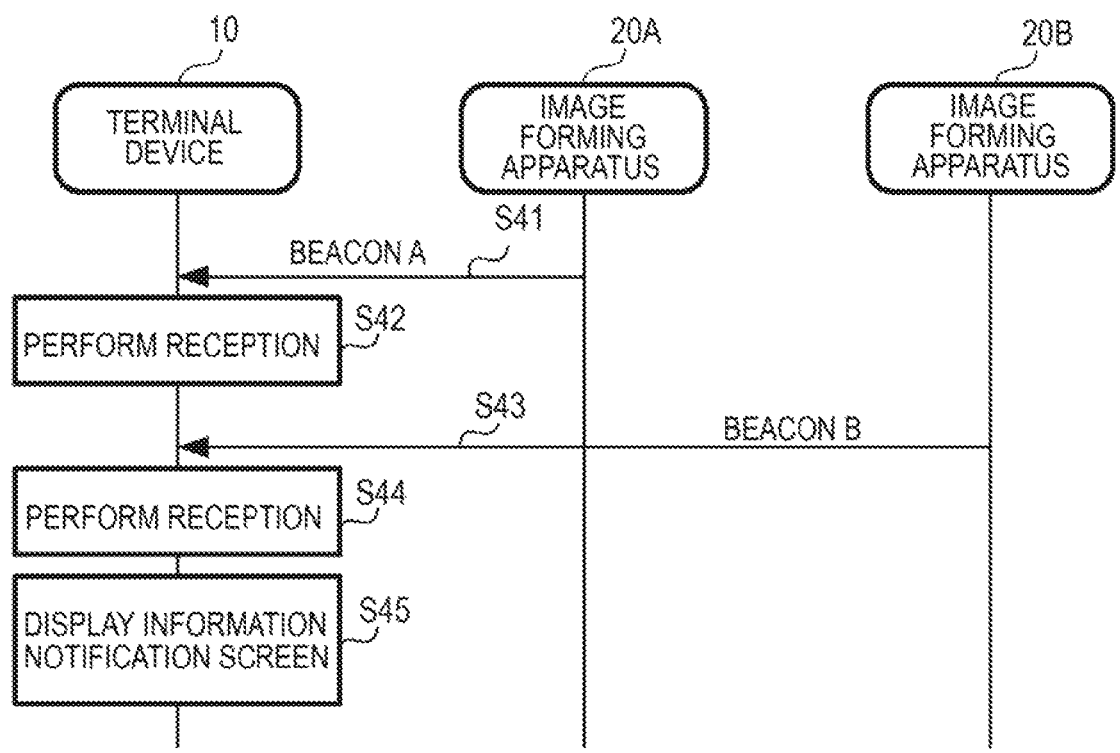
FIG. 10 is a sequence diagram illustrating a flow of processes performed in image forming processing, in the information processing system according to the second exemplary embodiment.

FIG. 10 is a sequence diagram illustrating a flow of processing performed based on the control data, in the information processing system 1.

The terminal device 10 receives the beacon A transmitted by the image forming apparatus 20A (Steps S41 and S42), and receives the beacon B transmitted by the image forming apparatus 20B (Steps S43 and S44). Here, it is assumed that the terminal device 10 is at a position which allows near field communication with the image forming apparatuses 20A and 20B.

Then, the terminal device 10 displays an information notification screen on the display 15 (Step S45).

Figure 11:
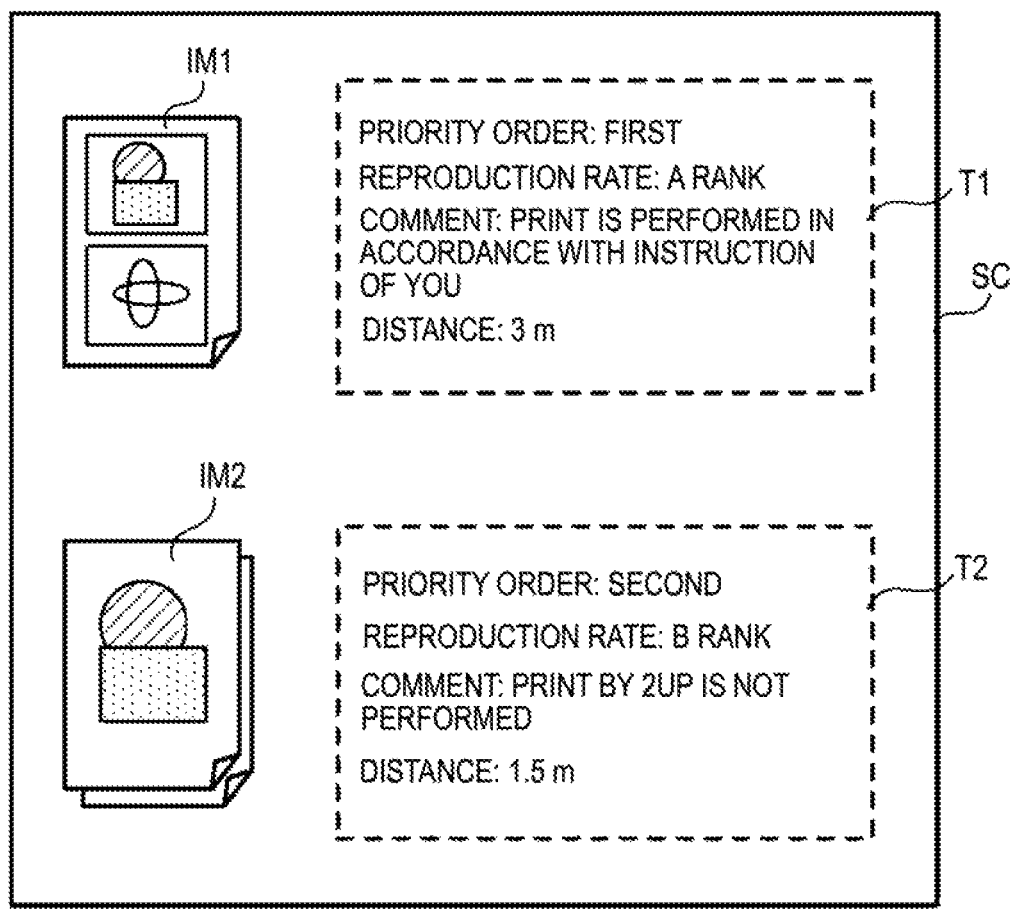
FIG. 11 is a diagram illustrating an information notification screen according to the second exemplary embodiment.

FIG. 11 is a diagram illustrating an example of the information notification screen. In the information notification screen SC illustrated in FIG. 11, a print image IM1 corresponding to the image forming apparatus 20A is associated with a notification region T1, and a print image IM2 corresponding to the image forming apparatus 20B is associated with a notification region T2. Here, it is assumed that a user designates performing of the image forming processing by "2up", but the image forming processing by "2up" is possible in the image forming apparatus 20A, and the image forming processing by "2up" is not possible in the image forming apparatus 20B. In this case, the print image IM1 indicates a result in a case where the image forming processing by "2up" is performed. The print image IM2 indicates a result in a case where the image forming processing by "2up" is not performed, and image forming processing in which an image of one page is formed on one piece of sheet is performed.

Information for a use priority order of the image forming apparatuses 20A and 20B, a reproduction rate, a comment, and a distance is indicated in each of the notification regions T1 and T2. The priority order becomes higher as the image forming apparatus 20 becomes more appropriate for a use. The reproduction rate indicates a higher rank as the image forming processing of which an instruction is performed by a user is faithfully performed. The comment indicates the type of image forming processing to be performed, with reference to capability of the image forming apparatus 20. The distance indicates a distance from the terminal device 10 to the image forming apparatus 20. The distance from the terminal device 10 to the image forming apparatus 20 is calculated by the terminal device 10 analyzing strength of a radio wave of the near field communication.

Here, it is shown that the priority order becomes higher as the reproduction rate is high, and the priority order becomes higher as the distance is close in a case where reproduction rates are the same as each other. However, for example, it may be shown that the priority order becomes higher as the distance is close, and the priority order becomes higher as the reproduction rate is high in a case where distances are the same as each other. A user determines an image forming apparatus 20 to be used, considering the information notification screen SC. The user moves to a location of the image forming apparatus 20 to be used, and causes the image forming apparatus 20 to perform the image forming processing. Processes for the image forming, processing may be the same as the processes in FIG. 7.

In a case where an image forming apparatus 20 in which performing processing designated by the processing parameter of the control data 162 is not possible is provided, information regarding this image forming apparatus 20 may be not displayed on the information notification screen, or a message indicating that performing processing is not possible may be not displayed.

In a case where only the image forming apparatus 20A is provided as an image forming apparatus 20 which allows the near field communication with the terminal device 10, information corresponding to the image forming apparatus 20A is displayed on the information notification screen. However, information corresponding to the image forming apparatus 20B is not displayed. Similarly, in a case where only the image forming apparatus 20B is provided as an image forming apparatus 20 which allows the near field communication with the terminal device 10, information corresponding to the image forming apparatus 20B is displayed on the information notification screen. However, information corresponding to the image forming apparatus 20A is not displayed.

In the above-described information processing system 1 according to the second exemplary embodiment, a notification of information regarding a result of performing processing is performed with reference to performing capability of the processing in the image forming apparatus 20. Thus, a user can select an image forming apparatus 20 to be used for processing, with reference to the information of which the notification is performed.

Modification Example

The present invention may be implemented by using a form which is different from the above-described exemplary embodiments. Modification examples which will be described below may be combined with each other.

In the above-described exemplary embodiments, the image forming apparatus 20 acquires one of the original file and the duplicate file, in accordance with a result obtained by comparing time stamps to each other. Instead of this, the image forming apparatus 20 may normally acquire the duplicate file without comparison of the time stamps. This is because that the duplicate file is substantially the same as the original file when an operation tear performing the output processing is performed.

The image forming apparatus 20 may select one of processing in which one of the original file and the duplicate file is acquired in accordance with a result obtained by comparing the time stamps, and processing in which the duplicate file is normally acquired, in accordance with details of the output processing.

A notification of the information regarding the result of performing processing in the above-described second exemplary embodiment is not limited to display of an image, may be performed by outputting sound, for example. A portion of information included in the information notification screen SC may be omitted, and another piece of information may be included. The reproduction rate may be presented by, for example, using a percentage winch indicates a ratio of reproducible processing to the entirety of processing.

The format of information may be variously modified.

In the above-described exemplary embodiments, a case where, an information processing apparatus in the present invention is applied to the image forming apparatus 29 is described.

However, the information processing apparatus in the present invention may not have a function of forming an image. The information processing apparatus in the present invention may perform processing by using data which has been acquired from the cloud server 30. Thus, the information processing apparatus in the present invention may be, for example, an information processing apparatus such as a personal computer.

Some of the components or the operations of the information processing system 1, which are described in the above-described exemplary embodiments may be omitted or changed. For example, processing of using a token may be omitted. In a case where it is assumed that one cloud server 30 is provided, or in a case where interfaces of plural cloud server 30 are common with each other, the terminal device may cause the format of data not to vary depending on the cloud server 30 as a transmission destination. The terminal device 10 may transmit the duplicate instruction data with an operation other than the operation for performing the output processing, as a momentum (for example, with all operations as a momentum).

The hardware configuration of the terminal device 10 or the image forming apparatus 20 is not limited to that exemplified in the above exemplary embodiments. As long as the required function may be realized, the image forming apparatus 20 may have any hardware configuration.

The functions realized by the terminal device 10 or the image forming apparatus 20 in the above-described exemplary embodiments may be realized by one or plural hardware circuits. The functions may be realized by a computation device executing one or plural programs. The functions may be realized by a combination of the hardware circuit and the program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
   a terminal device; and
   an information processing apparatus that performs processing which is designated by the terminal device, by using a file stored in an external server device,
   wherein the terminal device includes:
      a parameter transmission unit that transmits a parameter to the server device, the parameter being used for designating processing which is performed by using a first file stored in the server device;
      an instruction data transmission unit that transmits instruction data for performing an instruction of storing a second file which is a duplicate of the first file, to the server device;
      a control data memory that stores the control data which includes the parameter and storing location information indicating a storing location of the second file, the control data further including a first time stamp depending on a time point at which the parameter is transmitted to the server device, and the first file including a second time stamp depending on a time point at which an update is performed last; and
      a control data transmission unit that transmits the stored control data to the information processing apparatus, and
   wherein the information processing apparatus includes:
      a control data reception unit that receives the control data from the terminal device;
      a file acquisition unit that requires transmission of the second file to the server device based on the storing location information which is included in the received control data, and acquires the first file from the server device in a case where the first time stamp concurs with the second time stamp, and acquires the second file from the server device in a case where the first time stamp does not concur with the second time stamp, or in a case where the first file is not provided; and
      a performing unit that performs processing which is designated by the parameter included in the received control data, by using the acquired first file or second file.

2. The information processing system according to claim 1,
   wherein the information processing apparatus includes a transmission unit that wirelessly transmits capability data indicating capability of the performing unit for performing processing,
   wherein the terminal device includes:
      a capability data reception unit that receives the capability data from the information processing apparatus; and
      a notification unit that performs a notification of information regarding a performing result obtained by the performing unit performing processing, based on the received capability data and the parameter included in the control data.

3. The information processing system according to claim 2, further comprising a display,
   wherein the notification unit causes an image output by the processing of the performing unit to be displayed in the display, so as to perform a notification of the image.

4. The information processing system according to claim 2, wherein the notification unit performs a notification of information regarding the performing result and a distance from the terminal device to the information processing apparatus, the information and the distance being associated with each other.

5. The information processing system according to claim 1, further comprising an authentication information memory that stores authentication information which is commonly used among a plurality of server devices each of which is the server device,
- wherein the parameter transmission unit transmits the parameter having a format which corresponds to the server device as a transmission destination, in association with the stored authentication information,
- wherein the instruction data transmission unit transmits the instruction data having a format which corresponds to the server device as the transmission destination, in association with the stored authentication information,
- wherein the control data transmission unit transmits the control data in association with the stored authentication information, and
- wherein the file acquisition unit acquires the first file or second file from the server device by using the authentication information which has been received from the terminal device.

6. A terminal device comprising:
- a parameter transmission unit that transmits a parameter to an external server device, the parameter being used for designating processing which is performed by using a first file stored in the server device;
- an instruction data transmission unit that transmits instruction data for performing an instruction of storing a second file which is a duplicate of the first file, to the server device;
- a control data memory that stores control data which includes parameter and storing location information indicating a storing location of the second file;
- a control data transmission unit that transmits the stored control data to an external information processing apparatus that includes a transmission unit that wirelessly transmits capability data indicating capability of a performing unit for performing processing, acquires the second file by requiring transmission of the second file to the server device based on the storing location information which is included in the control data, and transmits the acquired second file to the information processing apparatus which performs processing designated by the parameter included in the control data, by using the acquired second file;
- a capability data reception unit that receives the capability data from the information processing apparatus; and
- a notification unit that performs a notification of information regarding a performing result obtained by the performing unit performing processing and a distance from the terminal device to the information processing apparatus, the information and the distance being associated with each other, based on the received capability data and the parameter included in the control data.

7. An information processing apparatus comprising:
- a control data reception unit that receives control data which includes parameter and storing location information and further includes a first time stamp depending on a time point at which the parameter is transmitted to the server device, from an external terminal device, the parameter being used for designating processing which is performed by using a first file that includes a second time stamp depending on a time point at which an update is performed last, and being transmitted to the server device in which the first file is stored, the storing location information indicating a storing location of a second file which is a duplicate of the first file in the server device;
- a file acquisition unit that requires transmission of the second file to the server device based on the storing location information which is included in the received control data, and acquires the first file from the server device in a case where the first time stamp concurs with the second time stamp, and acquires the second file from the server device in a case where the first time stamp does not concur with the second time stamp, or in a case where the first file is not provided; and
- a performing unit that performs processing designated by the parameter which is included in the received control data, by using the acquired first file or second file.

8. A non-transitory computer readable medium storing a program causing a computer of a terminal device to execute a process, the process comprising:
- transmitting a parameter to an external server device, the parameter being used for designating processing which is performed by using a first file stored in the server device;
- transmitting instruction data for performing an instruction of storing a second file which is a duplicate of the first file, to the server device;
- storing control data which includes parameter and storing location information indicating a storing location of the second file and further including a first time stamp depending on a time point at which the parameter is transmitted to the server device, and the first file including a second time stamp depending on a time point at which an update is performed last; and
- transmitting the stored control data to an external information processing apparatus, acquiring the first file from the server device in a case where the first time stamp concurs with the second time stamp, and acquiring the second file from the server device in a case where the first time stamp does not concur with the second time stamp, or in a case where the first file is not provided, by requiring transmission of the second file to the server device based on the storing location information which is included in the control data, and transmitting the acquired first file or second file to the information processing apparatus which performs processing designated by the parameter which is included in the control data, by using the acquired first file or second file.

* * * * *